US009218334B2

(12) United States Patent
Mugali, Jr. et al.

(10) Patent No.: US 9,218,334 B2
(45) Date of Patent: Dec. 22, 2015

(54) PRONOUNCEABLE DOMAIN NAMES
(71) Applicant: VeriSign, Inc., Reston, VA (US)
(72) Inventors: Aditya Anand Mugali, Jr., Reston, VA (US); Andrew W. Simpson, Sterling, VA (US); Scott King Walker, Purcellville, VA (US)
(73) Assignee: VERISIGN, INC., Reston, VA (US)
( * ) Notice: Subject to any disclaimer, the term of this patent is extended or adjusted under 35 U.S.C. 154(b) by 518 days.
(21) Appl. No.: 13/672,226
(22) Filed: Nov. 8, 2012
(65) Prior Publication Data
US 2013/0117013 A1 May 9, 2013

Related U.S. Application Data
(60) Provisional application No. 61/557,248, filed on Nov. 8, 2011.

(51) Int. Cl.
*G06F 17/27* (2006.01)
*G06F 17/28* (2006.01)
*H04L 29/12* (2006.01)
(52) U.S. Cl.
CPC .............. *G06F 17/274* (2013.01); *G06F 17/27* (2013.01); *G06F 17/28* (2013.01); *G06F 17/2881* (2013.01); *H04L 61/3025* (2013.01)
(58) Field of Classification Search
CPC .................................................. G06F 17/274
USPC ............................................. 704/9; 713/184
See application file for complete search history.

(56) References Cited

U.S. PATENT DOCUMENTS

| 5,850,448 | A | 12/1998 | Ganesan | |
|---|---|---|---|---|
| 7,062,482 | B1* | 6/2006 | Madan et al. | 707/758 |
| 7,912,716 | B2 | 3/2011 | McCuller | |
| 8,260,914 | B1* | 9/2012 | Ranjan | 709/224 |
| 2003/0182110 | A1* | 9/2003 | Deng | 704/231 |
| 2005/0004915 | A1 | 1/2005 | Hermand | |
| 2005/0038812 | A1* | 2/2005 | Tirpak et al. | 707/104.1 |
| 2005/0114673 | A1* | 5/2005 | Raikar et al. | 713/182 |
| 2007/0083369 | A1 | 4/2007 | McCuller | |
| 2008/0228485 | A1* | 9/2008 | Owen | 704/254 |
| 2009/0043584 | A1* | 2/2009 | Philips | 704/260 |
| 2009/0125308 | A1* | 5/2009 | Ambler | 704/254 |
| 2009/0259471 | A1* | 10/2009 | Kanevsky et al. | 704/260 |
| 2010/0306139 | A1* | 12/2010 | Wu et al. | 706/12 |
| WO 02/29593 | A1 | 4/2002 | | |

OTHER PUBLICATIONS

Heather Crawford et al., "Kwyjibo: automatic domain name generation", Software—Practice and Experience, vol. 36, 2008, pp. 1561-1587.
Mark Goadrich, "Generating Pronounceable Nonsense Words: Nifty Assignment", Journal of Computing Sciences in Colleges, vol. 26, Issue 5, May 2011, pp. 36-37.
Ethan, "Name.com Introduces Domain Nabber NXD Scores for .Net, .CC and .TV", Name.com Blog, Aug. 2011, Retrieved from the Internet: http://www.name.com/blog/general/development/2011/08/name-com-introduces-domain-nabber-nxd-scores-for-net-cc-and-tv/, pp. 1-2.
Extended European Search Report dated Mar. 11, 2015, European Application No. 12191872.6 filed Nov. 8, 2012, pp. 1-10.

* cited by examiner

*Primary Examiner* — Shaun Roberts
(74) *Attorney, Agent, or Firm* — MH2 Technology Law Group, LLP

(57) ABSTRACT

Embodiments of the present teachings relate to systems and methods for generating pronounceable domain names. The method includes proving a list of character strings; filtering the list of character strings through a first filter based on a phonetic model to produce a first filtered list of character strings; filtering the list of character strings through a second filter based on a character order mode to produce a second filtered list of character strings; and generating, by a processor, a list of pronounceable domain names based on the first filtered list of character strings and the second filtered list of character strings.

27 Claims, 4 Drawing Sheets

PRONOUNCEABLE DOMAIN NAMES

CROSS REFERENCE TO RELATED APPLICATIONS

This application claims priority from U.S. Provisional Patent Application Ser. No. 61/557,248, filed Nov. 8, 2011, which is hereby incorporated by reference in their entirety.

FIELD

This disclosure relates generally to systems and methods for building phonetic and character order models used to identify pronounceable domain names, and generating pronounceable domain names using the phonetic and character order models.

DESCRIPTION OF THE RELATED ART

Short domain names are popular because they can be catchy and easier to remember than longer domain names. However, when seeking to register a new domain name, many people argue that the .COM zone is full, and that there are no good domain names left. This is far from the truth. Although many domain names that contain dictionary words may be registered, statistically there remain a large number of unregistered and available domain names of different character lengths, many of which may be pronounceable. While some of these unregistered domain names may be nonsensical strings of characters, many of them may be easy to use and potentially could be popular and successful domain names if someone were to put marketing and brand name behind them. One example of this is Google.com. While the word google was not previously a word, it has now become a word.

One goal of short domain names may be to be memorable and communicable. That is, when viewing the domain name, individuals should be able to pronounce the domain name, remember the domain name, and, when telling the domain name to others, the other individuals should be able to remember and easily find the domain name. For example, if fifteen people were to look at a domain name (that is not a dictionary word) and ten to fifteen of those people were able to pronounce the domain name the same way and tell it to theft friends who could then easily find and visit the domain, the domain name may be a good choice, despite not being a real word.

More specifically, 5 and 6 character domain names are very popular. However, a very large percentage of 5 and 6 character domain names in the .COM zone have already been registered. As discussed above, however, there are many unregistered 5 and 6 character domain names that do not have any specific meaning in the English/Latin script, yet may be pronounceable.

It is accordingly an object of the disclosure to build models that may be used to identify pronounceable domain names. It is another object of the disclosure to generate pronounceable domain names using the pronounceable domain name models. The systems and methods according to embodiments of the disclosure may be used to generate pronounceable company names or websites based on input words relevant to the particular business.

These objects may be achieved by using a dictionary set to learn what words are pronounceable. A combination of Bayesian networks to learn the composition of phonetics in pronounceable words and decision trees to learn the order of characters in a pronounceable word may be used, along with n-gram scoring heuristics, to build models that can predict if a given word is pronounceable based on the learned models.

SUMMARY

In accordance with the disclosure, systems and methods for building phonetic and character order models used to identify pronounceable domain names, and generating pronounceable domain names using the phonetic and character order models are provided.

In one embodiment, a method of generating pronounceable domain names may include: (1) building a phonetic model representing phonetic characteristics of pronounceable words; (2) building a character order model representing character order characteristics of pronounceable words; and generating a list of pronounceable domain names by generating a list of character strings, and passing the list of character strings through a first filter based on the phonetic model and a second filter based on the character order model.

In implementations, a computer-implemented method of generating pronounceable domain names is disclosed. The computer-implemented method can comprise providing a list of character strings; filtering the list of character strings through a first filter based on a phonetic model to produce a first filtered list of character strings; filtering the list of character strings through a second filter based on a character order model to produce a second filtered list of character strings; and generating, by a processor, a list of pronounceable domain names based on the first filtered list of character strings and the second filtered list of character strings.

In implementations, the computer-implemented method can further comprise building the phonetic model representing phonetic characteristics of pronounceable words.

In implementations, the computer-implemented method can further comprise building the character order model representing character order characteristics of pronounceable words.

In implementations, in the building of the phonetic model, the method can further comprise preparing a library of source words comprising pronounceable words and non-pronounceable words; and providing the library of source words to a learning model algorithm to train the learning model algorithm to determine characteristics of pronounceable and characteristics of non-pronounceable words.

In implementations, the learning model algorithm can comprise a Bayesian network.

In implementations, in the preparing the library, the method can comprise building an attribute relationship file format (ARFF) based on the library of source words; and associating one or more attributes of pronounceable words and non-pronounceable words with the ARFF.

In implementations, at least one attribute of the one or more attributes of pronounceable words and non-pronounceable words can comprise an n-gram score.

In implementations, the computer-implemented method can further comprise calculating a first n-gram score for the pronounceable words in the library; and calculating a second n-gram score for the non-pronounceable words in the library.

In implementations, an attribute of the one or more attributes of pronounceable words and non-pronounceable words can comprise a phonetic representation.

In implementations, the computer-implemented method can further comprise determining the phonetic representation for each pronounceable word and each non-pronounceable word in the library.

In implementations, the phonetic representation can comprise a Metaphone representation or a Double Metaphone representation.

In implementations, the building the character order model can further comprise preparing a library of source words comprising pronounceable and non-pronounceable words; and associating attributes of pronounceable source words and attributes of non-pronounceable source words with words in the library of source words.

In implementations, the phonetic model can be operable to determine a probability that an input character string of the list of character strings is pronounceable.

In implementations, the character order model can be operable to determine a probability that an input character string of the list of character strings is pronounceable.

In implementations, the first filtered list of character strings can be provided to the second filter to produce a second filtered list of character strings.

In implementations, the second filtered list of character strings can be provided to the first filter to produce a first filtered list of character strings.

In implementations, the computer-implemented method can further comprise determining a first probability, using the phonetic model, that an input character string of the list of character strings is pronounceable; determining a second probability, using the character order model, that the input character string is pronounceable; and determining a combined probability based on the first probability and the second probability that the input character string is pronounceable; comparing the combined probability with a pronounceability threshold to determine whether the input character string is likely to be pronounceable; and providing the input character string as the list of pronounceable domain names.

In implementations, the computer-implemented method can further comprise determining if a pronounceable domain name in the list of pronounceable domain names is registered; and providing a list of alternative suggestions of unregistered pronounceable domain names from the list of pronounceable domain names if the pronounceable domain name is determined to be registered or is unregistered.

In implementations, the computer-implemented method can further comprise ordering the list of alternative suggestions of unregistered pronounceable domain names based on one or more of the following: a primitive distance between the pronounceable domain name and the alternative suggestions of unregistered pronounceable domain names, a degree of similarity between the pronounceable domain name and the alternative suggestions of unregistered pronounceable domain names, an amount of traffic the pronounceable domain name is receiving, or combinations thereof.

In implementations, a device is disclosed that can comprise at least one processor; and a non-transitory computer readable medium comprising instructions that cause the at least one processor to perform a method comprising: providing a list of character strings; filtering the list of character strings through a first filter based on a phonetic model to produce a first filtered list of character strings; filtering the list of character strings through a second filter based on a character order model to produce a second filtered list of character strings; and generating, by a processor, a list of pronounceable domain names based on the first filtered list of character strings and the second filtered list of character strings.

In implementations, a computer readable storage medium is disclosed that can comprise instruction that cause one or more processors to perform a method comprising: providing a list of character strings; filtering the list of character strings through a first filter based on a phonetic model to produce a first filtered list of character strings; filtering the list of character strings through a second filter based on a character order model to produce a second filtered list of character strings; and generating, by a processor, a list of pronounceable domain names based on the first filtered list of character strings and the second filtered list of character strings.

Additional objects and advantages of the embodiments of the disclosure will be set forth in part in the description which follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

Figure 1:
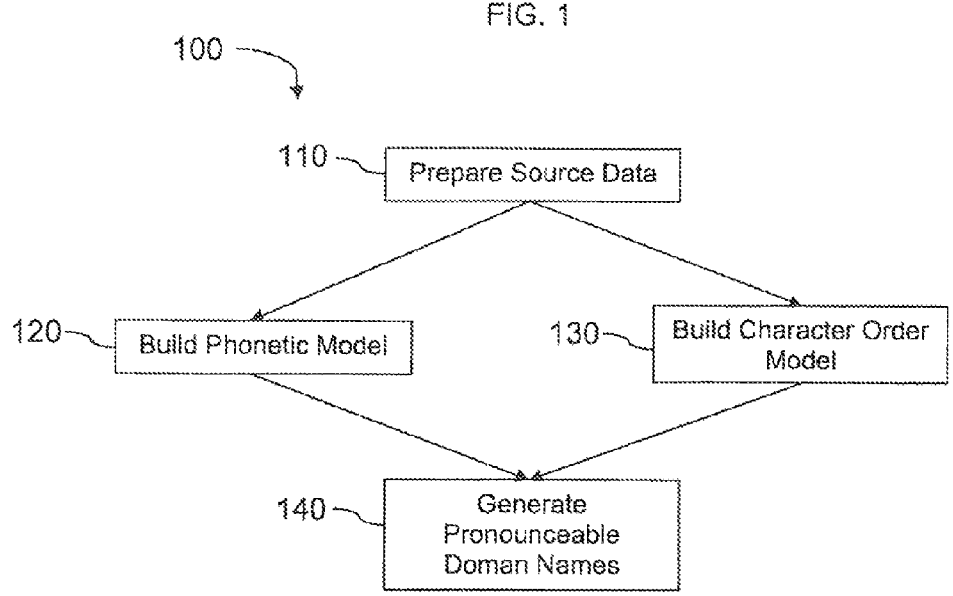
FIG. 1 illustrates an exemplary flowchart for a method according to embodiments for the disclosure.

FIG. 1 illustrates an exemplary flowchart for a method 100 for building phonetic and character order models used to identify pronounceable domain names, and generating pronounceable domain names using the phonetic and character order models. While FIG. 1 illustrates various processes that can be performed, one skilled in the art will realize that any of the processes and stages of the processes can be performed by other components of a computing device. Likewise, one skilled in the art will realize that the illustrated stages of the processes are exemplary and that any of the illustrated stages can be removed, additional stages can be added, and the order of the illustrated stages can be changed.

The method may be carried out for domain names of a specific length (e.g., 5 characters), or for domain names of multiple lengths (e.g., all domain names having 3 10 characters). Throughout this disclosure, embodiments will be described for generating pronounceable domain names having a length of 5 characters. However, the exemplary embodiments having 5 character domain names are not intended to limit the scope of this disclosure, but are provided as an illustration of only a subset of possible embodiments of the disclosure.

As shown in FIG. 1, source data is gathered and prepared in 110. The source data may include both pronounceable and non-pronounceable words. Throughout this disclosure, the term "words" is used in accordance with its ordinary usage, and also to generally denote character strings, whether or not the character strings form "words" in the ordinary sense.

The pronounceable words in the source data may be taken from an English language dictionary. For purposes of building the models, it is assumed that all dictionary words are pronounceable. Throughout this disclosure, the domain names are discussed with respect to English words and pronounceability. However, the systems and methods disclosed could also be used in connection with domain names and pronounceability of other languages. For example, to generate pronounceable domain names in Spanish, a Spanish language dictionary could be used in place of an English language dictionary. Other sources of pronounceable words could also be used for the source data, or a subset of dictionary words could be used.

The non-pronounceable words in the source data may be generated using a random string generator. For example, if 5 character domain names are being generated, a random string generator may generate random 5 character strings as non-pronounceable words for the source data. Alternatively, random character strings of varying lengths may be generated. For purposes of building the models, it is assumed that the randomly generated strings are non-pronounceable. In other embodiments, the randomly generated strings may be cross-checked against a list of dictionary words to remove any known pronounceable words from the randomly generated strings.

The source data includes both pronounceable and non-pronounceable words so that the learning models have learning information about characteristics of both pronounceable and non-pronounceable words. In one embodiment, the number of pronounceable words in the source data is substantially equal to the number of non-pronounceable words, in order to equally weight the source data. Although FIG. 1 illustrates only one set of source data being used for both the phonetic model and the character order model, in other embodiments, separate source data sets may be provided for the separate models.

In 120, a phonetic model is built using the source data prepared and obtained in 110. More specific details regarding building the phonetic model according to an embodiment are described below with reference to FIG. 2.

In 130, a character order model is built using the source data prepared and obtained in 110. More specific details regarding building the character order model according to an embodiment are described below with reference to FIG. 3.

In 140, pronounceable domain names are generated using the phonetic model and the character order model. Generating the pronounceable domain names may include creating a list of n-character input words (where n is the desired domain name length), and filtering the list input words through the phonetic and character order models. The list of n-character input words may be limited to a single n, for example, only 5 character input words, or may include several different lengths. In some embodiments, the input words are intended to be used as domain names, so only the characters 0-9, A-Z, and hyphen are included as possible characters. However, in other embodiments where the input words may be intended for use in other applications, other restrictions (or no restrictions) may be placed on the character set from which the n-character input words are formed.

Additionally, in one embodiment, the list of n-character input words may include all possible n-character words. In another embodiment, the list of n-character input words may include an appropriate subset of all possible n-character words.

For example, each of the models may return a probability that the input word is pronounceable, represented by an output from 0.0 to 1.0. The list of input words may be first filtered by the phonetic model. Then, the input to the character order model may be limited to only those input words with a probability value from the phonetic model that exceeds a predetermined threshold, for example, 90% or 0.9. The filtered input words may then be filtered by the character order model. After passing the filtered input words through the character order model, the final list of pronounceable domain names may be limited to only the input words with a probability value from the character order model that exceeds a predetermined threshold, for example, 95% or 0.95. The thresholds may be set at other probability values as desired or determined to return optimum results.

In other embodiments, the order of the filtering may be reversed, with the input words first being filtered by the character order model, then filtered by the phonetic model. In other embodiments, all of the input words may be filtered by both models, and the final list of pronounceable domain names may be determined based on a combination of the two probability values returned by the models. For example, in one embodiment, only input words that received a predetermined probability, (e.g., at least 90% or 0.9) in both models may be included in the final list of pronounceable words or domain names. In another embodiment, the calculated probabilities may be combined or multiplied, then compared to a threshold, to determine whether each of the input words is sufficiently likely to be pronounceable as to be included in the final list of pronounceable domain names.

It should be noted that, while FIG. 1 illustrates the phonetic model and character order models being built in parallel, in other embodiments, the models may be built consecutively or in any other order.

Figure 2:
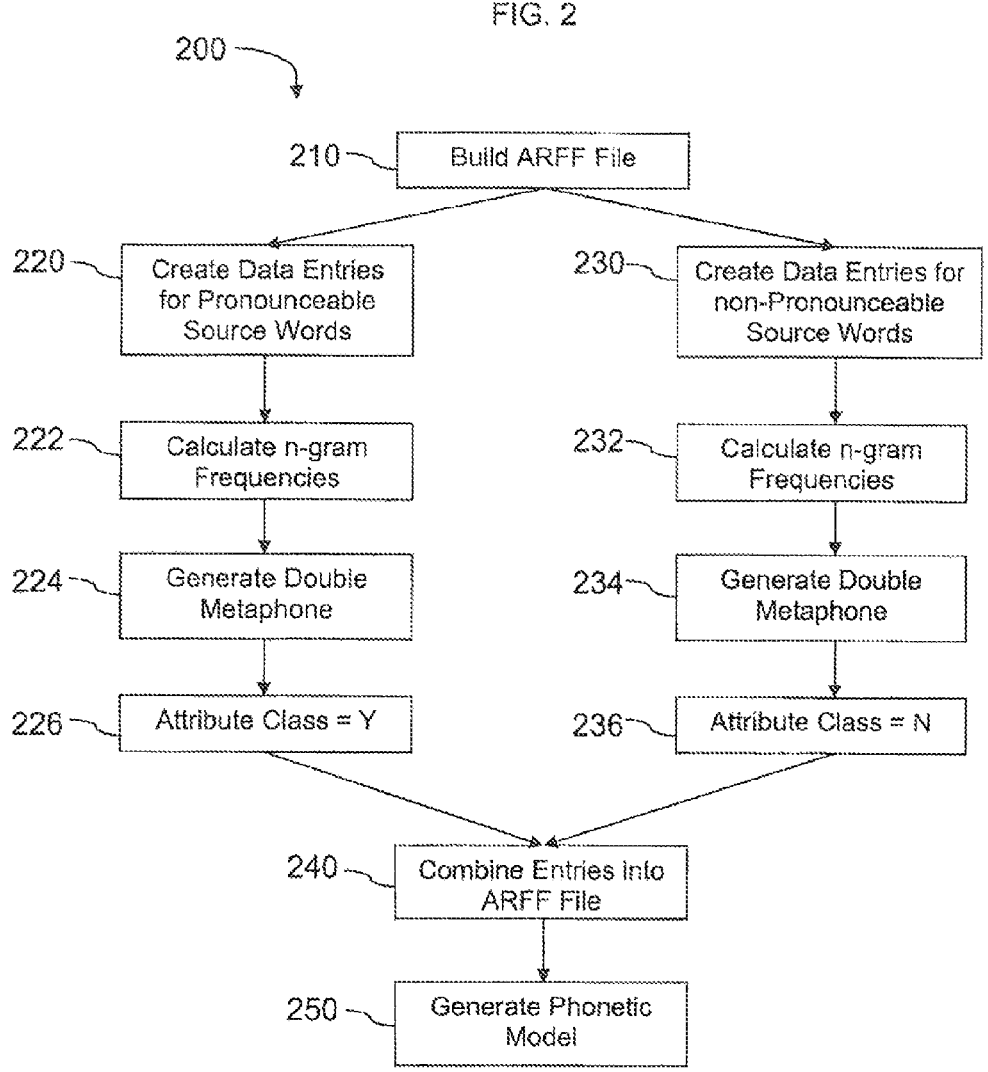
FIG. 2 illustrates an exemplary flowchart for a method of creating a phonetic model according to embodiments of the disclosure.

FIG. 2 illustrates an exemplary flowchart for a method 200 of creating a phonetic model according to embodiments of the disclosure. Although the embodiment illustrated in FIG. 2 and discussed below specifically uses the open source WEKA program and a Bayesian network to learn, develop and generate the phonetic model, other programs and learning models may be used in other embodiments. While FIG. 2 illustrates various processes that can be performed, one skilled in the art will realize that any of the processes and stages of the processes can be performed by other components of a computing device. Likewise, one skilled in the art will realize that the illustrated stages of the processes are exemplary and that any of the illustrated stages can be removed, additional stages can be added, and the order of the illustrated stages can be changed.

As shown in FIG. 2, an attribute relationship file format (ARFF) the is built using source data in 210. The source data may be, for example, source data such as is prepared in 110 above. In one embodiment, the number of pronounceable words in the source data is substantially equal to the number of non-pronounceable words, in order to equally weight the source data. The ARFF is a text file format used by WEKA to store data in a database. The ARFF file contains attributes about the source data. The attributes for the source data that contains pronounceable words may be generated separate from the attributes for the source data that contains non-pronounceable words.

In 220, data entries for pronounceable source words may be created. Similarly, in 230, data entries for non-pronounceable source words may be created.

In 222, n-grams over the set of pronounceable source words may be calculated. For example, if the domain names that are ultimately to be generated are 5 character strings, 2-grams, 3-grams, and 4-grams may be calculated over the set of pronounceable source words. An n-gram's value is the total number of occurrences of the n-gram in the set of source words. As a brief example, if the source includes only the words "attack, daily, data, fail, fill", then the n-gram score for "ail" is 2, for "ai" is 2, for "il" is 3, for "at" is 2, and for "da" is 2. Other n-grams in this data set, such as "atta" occur only once, for a score of 1. The n-grain scores form attributes of the ARFF file for each pronounceable source word.

In the above brief example, the 2-gram attribute of "daily" would be the sum of the 2-gram scores for the 2-grams within the word daily: da, ai, ii, and ly, which are 2, 2, 3, and 1, for a total 2-gram attribute score of 8. The 3-gram attribute of "daily" would be the sum of the 3-gram scores for the 3-grams within the word daily: dai, ail, and ily, which are 1, 2, and 1, for a total 3-grain attribute score of 4. The process for calculating the n-gram attribute for each value of n continues in this manner.

In 232, n-grams over the set of non-pronounceable source words may be calculated, and n-gram attributes generated, in a manner similar to that described above with reference to 222. In other embodiments, the calculated n-gram frequencies from the pronounceable source words may be used to generate the n-gram attributes for the non-pronounceable source words, without calculating n-gram frequencies over the non-pronounceable source words.

In 224, a Double Metaphone attribute is defined for each of the pronounceable source words. The Double Metaphone attribute is based on the Double Meta phone representation of the source words. The Double Meta phone is a standard phonetic representation of words. In other embodiments, other phonetic representations of the source words may be used, such as a Metaphone representation or any future version or variant of such. Each character in the Double Metaphone representation of the source words may form an attribute.

In 234, a Double Metaphone attribute is defined for each of the non-pronounceable source words, similar to the method described in 224 with respect to the pronounceable source words.

In 226, a class attribute is defined for each of the pronounceable source words. The class attribute identifies whether the source word is pronounceable. Thus, each of the pronounceable source words receives a class attribute "Y", or other affirmative representation. Similarly, in 236, each of the non-pronounceable source words receives a class attribute "N", or other negative representation.

In 240, the attributes of the pronounceable source words and the attributes of the non-pronounceable source words are combined into the ARFF file. In other embodiments, the pronounceable and non-pronounceable source words are not separately processed (as illustrated in FIG. 2), but are instead processed together, in which case there may be no need to combine the attributes into the ARFF file, because they will already be present in the ARFF file.

In 250, a phonetic model is generated based on the attributes of the pronounceable source words and non-pronounceable source words included in the ARFF file. In one embodiment, this is accomplished using the Bayesian Network Algorithm in WEKA. The resulting Bayesian network model, or phonetic model, can be used to predict a probability that a given input string will be pronounceable. While a Bayesian network has been described as used to generate the phonetic model, other appropriate machine learning models may be used in other embodiments.

Figure 3:
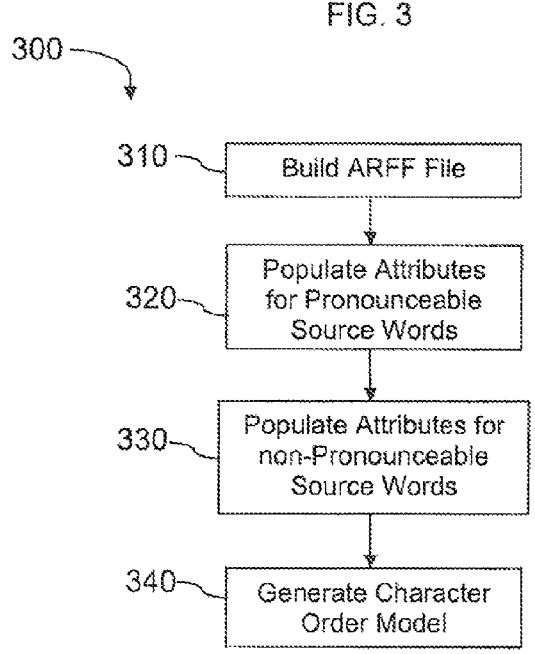
FIG. 3 illustrates an exemplary flowchart for a method of character order model according to embodiments of the disclosure.

FIG. 3 illustrates an exemplary flowchart for a method 300 of creating a character order model according to embodiments of the disclosure. The character order model may determine the probability that an input word is pronounceable based on information learned by and stored in the model relating to the chain or order of letters in pronounceable words. While FIG. 3 illustrates various processes that can be performed, one skilled in the art will realize that any of the processes and stages of the processes can be performed by other components of a computing device. Likewise, one skilled in the art will realize that the illustrated stages of the processes are exemplary and that any of the illustrated stages can be removed, additional stages can be added, and the order of the illustrated stages can be changed.

As shown in FIG. 3, an ARFF file is built using source data in 310. The source data may be, for example, source data such as is prepared in 110 above, and/or source data that was used in the method 200 described above. In one embodiment, the number of pronounceable words in the source data is substantially equal to the number of nonpronounceable words, in order to equally weight the source data.

In 320, the ARFF file is populated with attributes of the pronounceable source words. The attributes of the ARFF file for the character order model include the characters of the source words, and a class attribute that identifies whether the word is pronounceable. Thus, in 320, the ARFF file is populated with the character attributes of the pronounceable source words, and a class attribute "Y".

In 330, the ARFF file is populated with attributes of the nonpronounceable source words. The attributes of the non-pronounceable source words are populated in a similar manner as described above with respect to the pronounceable source words, except that the class attribute for the non-pronounceable source words is "N".

In 340, the character order model is generated based on the attributes of the pronounceable and non-pronounceable source words stored in the ARFF file. This may be accomplished using the J48 decision tree algorithm in WEKA. The resulting character order model can be used to predict a probability that a given input string will be pronounceable. While the J48 decision tree algorithm has been described as used to generate the character order model, other appropriate machine learning models may be used in other embodiments.

After building the phonetic and character order models based on source data, new input words may be processed using the phonetic and character order models to determine the probability that the new input words are pronounceable. If it is determined with a sufficient degree of certainty that the new input words are pronounceable, the new input words may be output to a user, or otherwise stored on a storage device. This may be useful, for example, in suggesting domain names to users seeking to register a domain name. For example, if a user requests a domain name that is already registered, the systems and methods described in the disclosure may be used to suggest alternative, pronounceable domain names based on the originally requested domain name. The suggestions may be based on the requested domain name, or a user may enter several relevant key words, and the suggestions may be based on those key words, rather than a specific requested domain name. For example, a primitive distance may be used to correlate the search terms with the possible suggestions from the pronounceable domain names system. That is, any term that is within a certain distance of the search term being passed to the system may be returned, and the system could perform further iterations to improve matches between the search terms and suggestions for even more relevant pronounceable domain name suggestions.

The output pronounceable words may be prioritized. The prioritized output words may be stored or displayed in the prioritized order. The output words may be prioritized, for example, based on the primitive distance between the output words and the input request. In other embodiments, the output words may be prioritized based on a degree of similarity of the output word with the input by the user. In another embodiment, the output words may be prioritized based on the amount of traffic the word or string is receiving. If the output word or string is not a registered domain name, NXD traffic information may be used to determine traffic volume for the non-existing domain.

By way of a non-limiting example, consider a teaming task for filter 1: create 2-, 3-, 4-gram score from dictionary. As an example three entry dictionary consisting of the following entries: foo, food, and world. The 2-grams are fo, oo, fo, oo, od, wo, or, rl, ld. The 3-grams are foo, foo, ood, wor, orl, rld. The 4-grams food, worl, orld. The scores across n-grams are, fo:2; oo:2; od:1; wo:1; or:1; rl:1; ld:1; foo:2; ood:1; wor:1; orl:1; rld:1; food:1; worl:1; orld:1. Double metaphone representations are then created of these words as shown in Table 1.

TABLE 1

Double Metaphone representations

| Word | Double Metaphone |
|---|---|
| Foo | F |
| Food | FT |
| World | ARLT |

The same is done for randomly generated words that aren't pronounceable and build the "learning" part of the ARFF for filter 1.

TABLE 2

Double Metaphone representations

| Word | Double Metaphone |
|---|---|
| Dfgss | TFKS |
| slkgh | SLKK |
| Kjsds | KSTS |

The ARFF can be represented as shown below:

```
@relation PronounceableNames
@attribute m1 {a,b,c,d,e,f,g,h,i,j,k,l,m,n,o,p,q,r,s,t,u,v,w,x,y,z,0,NONE}
@attribute m2 {a,b,c,d,e,f,g,h,i,j,k,l,m,n,o,p,q,r,s,t,u,v,w,x,y,z,0,NONE}
@attribute m3 {a,b,c,d,e,f,g,h,i,j,k,l,m,n,o,p,q,r,s,t,u,v,w,x,y,z,0,NONE}
@attribute m4 {a,b,c,d,e,f,g,h,i,j,k,l,m,n,o,p,q,r,s,t,u,v,w,x,y,z,0,NONE}
@attribute 2gramScore NUMERIC
@attribute 3gramScore NUMERIC
@attribute 4gramScore NUMERIC
@attribute class {Y,N}
@data
F,NONE,NONE,NONE,4,2,0,Y    // foo
F,T,NONE,NONE,5,3,1,Y       // food
A,R,L,T,4,3,2,Y             // world
T,F,K,S,0,0,0,N             // dfgss
S,L,K,K,0,0,0,N             // slkgh
K,S,T,S,0,0,0,N             // kjsds
```

The ARFF is then run through a Bayesian network to learn the model for filter 1

An ARFF is then created for the filter 2. This ARFF has to be created specific to a use case, so consider the filter is built for 5 letter words, instead of foo, food and world assume that we used hello, world and green. The ARFF can be represented as shown below:

```
@relation pronounceable
@attribute m1 {a,b,c,d,e,f,g,h,i,j,k,l,m,n,o,p,q,r,s,t,u,v,w,x,y,z}
@attribute m2 {a,b,c,d,e,f,g,h,i,j,k,l,m,n,o,p,q,r,s,t,u,v,w,x,y,z}
@attribute m3 {a,b,c,d,e,f,g,h,i,j,k,l,m,n,o,p,q,r,s,t,u,v,w,x,y,z}
@attribute m4 {a,b,c,d,e,f,g,h,i,j,k,l,m,n,o,p,q,r,s,t,u,v,w,x,y,z}
@attribute m5 {a,b,c,d,e,f,g,h,i,j,k,l,m,n,o,p,q,r,s,t,u,v,w,x,y,z}
@attribute class {Y,N}
@data
H,e,l,l,o,Y
W,o,r,l,d,Y
G,r,e,e,n,Y
D,f,g,s,s,N
S,l,k,g,h,N
K,j,s,d,s,N
```

This ARFF is then run through a decision tree 148 algorithm and build the model for filter 2.

The processing steps can include the following: (1) create a set of n-character names to be filtered; (2) pass the names through filter 1 which generates a probability for a given word to be pronounceable; (3) filter names that are below a given threshold; and (4) follow the same steps for filter 2.

The methods described throughout the description of embodiments of the disclosure may be implemented or performed by a system that includes a processor and a memory. An exemplary system for generating pronounceable domain names may include a processor, storage, a memory, and input/output (I/O) devices. The system may be implemented in various ways. For example, the system may be embodied in a general purpose computer, a server, a mainframe computer, or any combination of these components. The system may be standalone, or it may be part of a subsystem, which may, in turn, be part of a larger system. Further, the components of the system may be separated, or integrated into a single system.

The processor may include one or more known processing devices, such as a microprocessor from the Pentium™ or Xeon™ family manufactured by Intel™, the Turion™ family manufactured by AMD™, or any of various processors manufactured by Sun Microsystems. The memory may include one or more storage devices configured to store information used by processor to perform certain functions related to disclosed embodiments. The storage may include a volatile or non-volatile, magnetic, semiconductor, tape, optical, removable, non-removable, or other type of computer-readable medium used as a storage device.

In one embodiment, memory may include one or more programs or subprograms that may be loaded from storage or elsewhere that, when executed by the processor, perform various procedures, operations, or processes consistent with disclosed embodiments.

While the above disclosure has referred specifically to the pronounceability of domain names, the disclosed systems and methods may also be operable for generating other pronounceable words or character strings, for example, email addresses, gamertags, online identities, company or store names, etc. Also, the above disclosure is not limited to character strings of a specific length, but may be adapted as necessary to accommodate different lengths of character strings. Additionally, while the above disclosure refers to pronounceability in the English language, appropriate modifications may be made to accommodate other languages without departing from the spirit and scope of the invention. Further, while the source of the data has been described in embodiments as being a dictionary, other data sources may be used for obtaining and generating a list of pronounceable words. For example, domain names that individuals have tried to register, or web addresses that are frequently typed but do not correspond to any registered domain name may be used to create a control set of pronounceable words.

Figure 4:
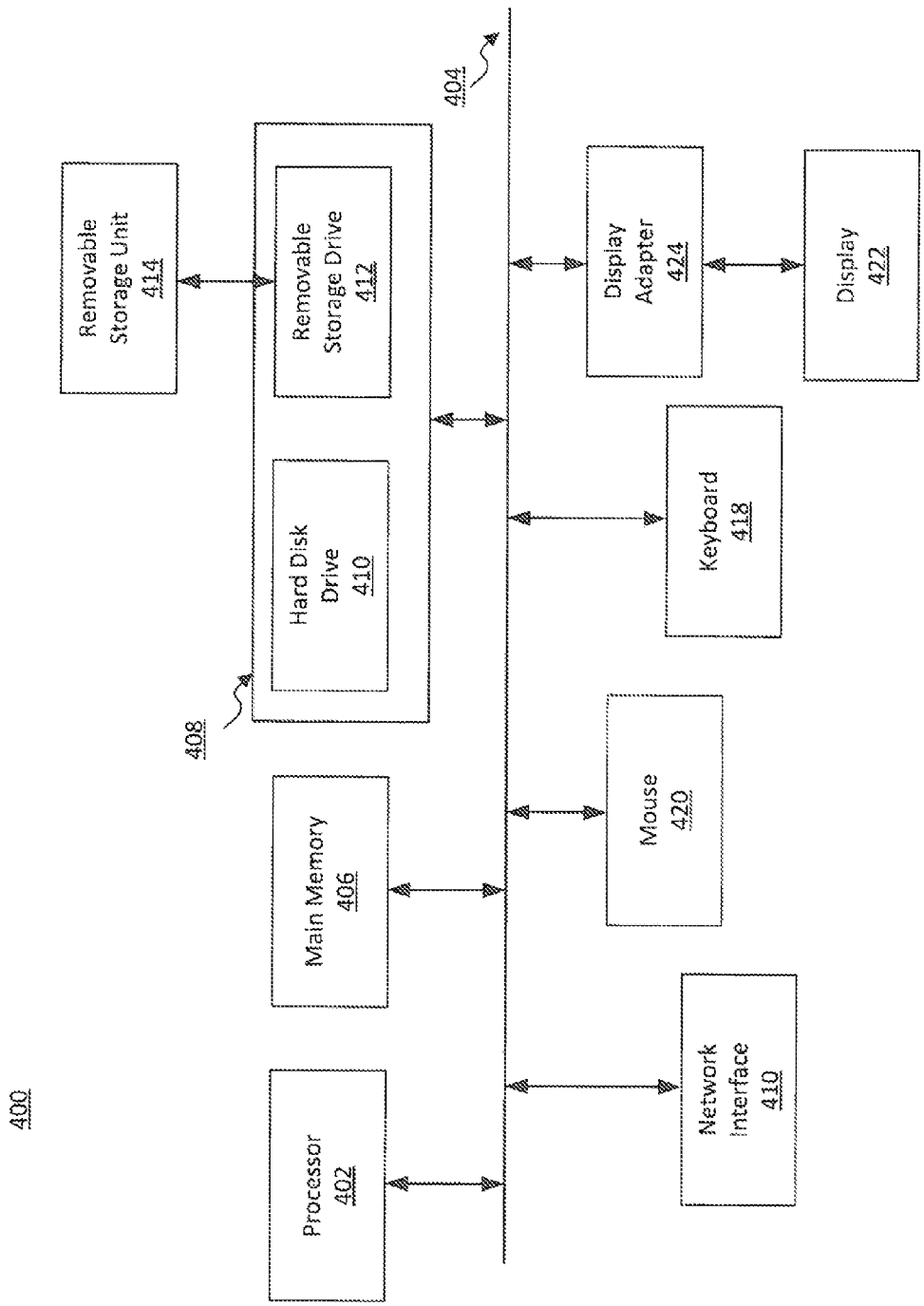
FIG. 4 is a block diagram of an exemplary computing system, according to various embodiments.

FIG. 4 illustrates an exemplary block diagram of a computing system 400 which can be implemented to preform the various processes of FIGS. 1-3 according to various embodiments. While FIG. 4 illustrates various components of computing system 400, one skilled in the art will realize that existing components can be removed or additional components can be added.

As shown in FIG. 4, computing system 400 can include one or more processors, such as processor 402 that provide an execution platform for embodiments of security tool 102. Commands and data from processor 402 are communicated over communication bus 404. Computing system 400 can also include main memory 406, for example, one or more computer readable storage media such as a Random Access Memory (RAM), where security tool 102, and/or other application programs, such as an operating system (OS) can be executed during runtime, and can include secondary memory 408. Secondary memory 408 can include, for example, one or more computer readable storage media or devices such as hard disk drive 410 and/or removable storage drive 412, representing a floppy diskette drive, a magnetic tape drive, a compact disk drive, etc., where a copy of an application program embodiment for security tool 102 can be stored. Removable storage drive 412 reads from and/or writes to removable storage unit 414 in a well-known manner. The computing system 400 can also include a network interface 416 in order to connect with the one or more networks 110.

In embodiments, a user can interface with computing system 400 and operate security tool 102 with keyboard 418, mouse 420, and display 422. To provide information from computing system 400 and data from security tool 102, the computing system 400 can include display adapter 424. Display adapter 424 can interface with communication bus 404 and display 422. Display adapter 424 can receive display data from processor 402 and convert the display data into display commands for display 422.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

Figure 5:
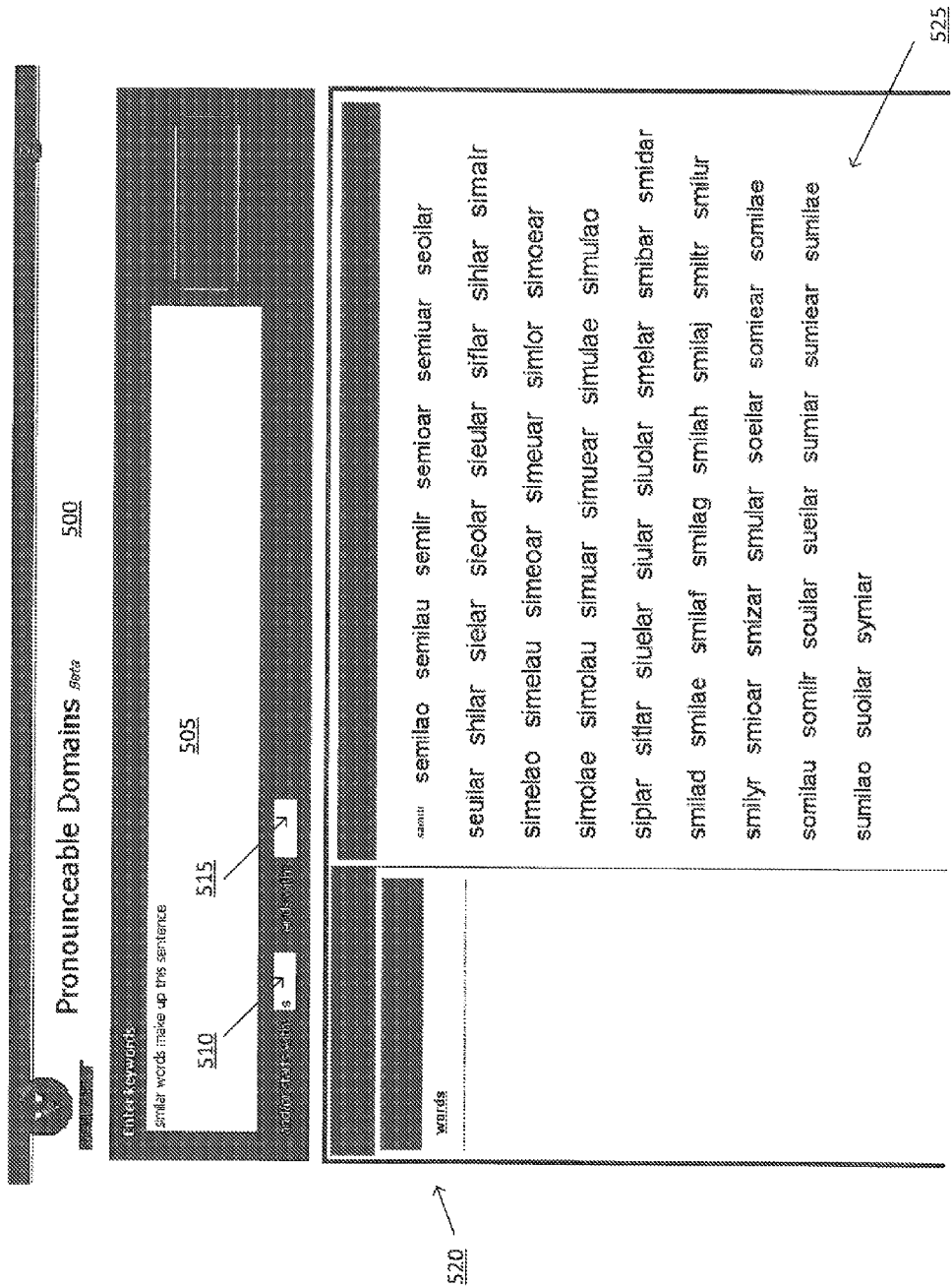
FIG. 5 illustrates an exemplary user interface according to embodiments for the disclosure.

FIG. 5A illustrates an exemplary user interface according to embodiments for the disclosure. While FIG. 5A illustrates various aspects, fields, or attributes of the exemplary user interface, one skilled in the art will realize that any of the aspects, fields, or attributes can be removed, additional aspects, fields, or attributes can be added, and the order of the illustrated aspects, fields, or attributes can be changed.

The user interface 505 can be any of user interface that allows the user to enter, view, and interact with pronounceability service in relation to processes discussed in relation to FIGS. 1-3. The pronounceability service can provide the user interface 505 to the user via an output device, such as a display. Field 505 is a field that allows the user to enter one or more keywords, such as domain names, to be analyzed according to the processes of FIGS. 1-3. Field 510 is a field that allows the user to enter one or more characters that the one or more keywords can begin with. Field 515 is a field that allows the user to enter one or more characters that the one or more keywords can end with. Field 520 is a field that allows the user to view previously entered keywords. Field 525 is a field that allows the user to view result based on the entered keyword and the processes of FIGS. 1-3.

In the above examples WEKA and ARFF are used to illustrate various implementations in which aspects of the present disclosure can be performed. For example, WEKA is one of variety of programs that can be used for modeling, which uses ARFF as the file format to interact with WEKA. In general, ARFF is a format useful for characterizing a feature vector that can be used to train a machine learning model. However, different applications may leverage different formats to represent feature vectors.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method of generating pronounceable domain names, comprising:
   providing a list of character strings;
   determining a first probability that a character string in the list of character strings is pronounceable based on a phonetic model;
   determining a second probability that a character string in the list of character strings is pronounceable based on a character order model;
   filtering the list of character strings through a first filter based on the first probability to produce a first filtered list of character strings;
   filtering the list of character strings through a second filter based on the second probability to produce a second filtered list of character strings; and
   generating, by a processor, a list of pronounceable domain names based on the first filtered list of character strings and the second filtered list of character strings.

2. The computer-implemented method of claim 1, further comprising building the phonetic model representing phonetic characteristics of pronounceable words.

3. The computer-implemented method of claim 1, further comprising building the character order model representing character order characteristics of pronounceable words.

4. The computer-implemented method of claim 2, wherein building the phonetic model further comprises:
   preparing a library of source words comprising pronounceable words and non-pronounceable words; and
   providing the library of source words to a learning model algorithm to train the learning model algorithm to determine characteristics of pronounceable and characteristics of non-pronounceable words.

5. The computer-implemented method of claim 4, wherein the learning model algorithm comprises a Bayesian network.

6. The computer-implemented method of claim 4, wherein preparing the library comprises:
   building an attribute relationship file format (ARFF) based on the library of source words; and
   associating one or more attributes of pronounceable words and non-pronounceable words with the ARFF.

7. The computer-implemented method of claim 6, wherein at least one attribute of the one or more attributes of pronounceable words and non-pronounceable words comprises an n-gram score.

8. The computer-implemented method of claim 7, further comprising:
   calculating a first n-gram score for the pronounceable words in the library; and
   calculating a second n-gram score for the non-pronounceable words in the library.

9. The computer-implemented method of claim 6, wherein an attribute of the one or more attributes of pronounceable words and non-pronounceable words comprise a phonetic representation.

10. The computer-implemented method of claim 9, further comprising:
    determining the phonetic representation for each pronounceable word and each non-pronounceable word in the library.

11. The computer-implemented method of claim 9, wherein the phonetic representation comprises a Metaphone representation or a Double Metaphone representation.

12. The computer-implemented method of claim 3, wherein building the character order model further comprises:
    preparing a library of source words comprising pronounceable and non-pronounceable words; and
    associating attributes of pronounceable source words and attributes of non-pronounceable source words with words in the library of source words.

13. The computer-implemented method of claim 1, wherein the first filtered list of character strings is provided to the second filter to produce a second filtered list of character strings.

14. The computer-implemented method of claim 1, wherein the second filtered list of character strings is provided to the first filter to produce a first filtered list of character strings.

15. The computer-implemented method of claim 1, further comprising:
    determining a combined probability based on the first probability and the second probability that the input character string is pronounceable;
    comparing the combined probability with a pronounceability threshold to determine whether the input character string is likely to be pronounceable; and
    providing the input character string as the list of pronounceable domain names.

16. The computer-implemented method of claim 1, further comprising:
    determining if a pronounceable domain name in the list of pronounceable domain names is registered; and
    providing a list of alternative suggestions of unregistered pronounceable domain names from the list of pronounceable domain names if the pronounceable domain name is determined to be registered or is unregistered.

17. The computer-implemented method of claim 16, further comprising:
    ordering the list of alternative suggestions of unregistered pronounceable domain names based on one or more of the following: a primitive distance between the pronounceable domain name and the alternative suggestions of unregistered pronounceable domain names, a degree of similarity between the pronounceable domain name and the alternative suggestions of unregistered pronounceable domain names, an amount of traffic the pronounceable domain name is receiving, or combinations thereof.

18. A device comprising:
    at least one processor; and
    a non-transitory computer readable medium comprising instructions that cause the at least one processor to perform a method comprising:
    providing a list of character strings;
    determining a first probability that a character string in the list of character strings is pronounceable based on a phonetic model;
    determining a second probability that a character string in the list of character strings is pronounceable based on a character order model;
    filtering the list of character strings through a first filter based on the first probability to produce a first filtered list of character strings;
    filtering the list of character strings through a second filter based on the second probability model to produce a second filtered list of character strings; and
    generating, by a processor, a list of pronounceable domain names based on the first filtered list of character strings and the second filtered list of character strings.

19. The device of claim 18, wherein the method further comprising building the phonetic model representing phonetic characteristics of pronounceable words.

20. The device of claim 18, wherein the method further comprising building the character order model representing character order characteristics of pronounceable words.

21. The device of claim 19, wherein building the phonetic model further comprises:
   preparing a library of source words comprising pronounceable words and non-pronounceable words; and
   providing the library of source words to a learning model algorithm to train the learning model algorithm to determine characteristics of pronounceable and characteristics of non-pronounceable words.

22. The device of claim 21, wherein the learning model algorithm comprises a Bayesian network.

23. A non-transitory computer readable storage medium comprising instruction that cause one or more processors to perform a method comprising:
   providing a list of character strings;
   determining a first probability that a character string in the list of character strings is pronounceable based on a phonetic model;
   determining a second probability that a character string in the list of character strings is pronounceable based on a character order model;
   filtering the list of character strings through a first filter based on the first probability to produce a first filtered list of character strings;
   filtering the list of character strings through a second filter based on the second probability to produce a second filtered list of character strings; and
   generating, by a processor, a list of pronounceable domain names based on the first filtered list of character strings and the second filtered list of character strings.

24. The non-transitory computer readable storage medium of claim 23, wherein the method further comprising building the phonetic model representing phonetic characteristics of pronounceable words.

25. The non-transitory computer readable storage medium of claim 23, wherein the method further comprising building the character order model representing character order characteristics of pronounceable words.

26. The non-transitory computer readable storage medium of claim 24, wherein building the phonetic model further comprises:
   preparing a library of source words comprising pronounceable words and non-pronounceable words; and
   providing the library of source words to a learning model algorithm to train the learning model algorithm to determine characteristics of pronounceable and characteristics of non-pronounceable words.

27. The non-transitory computer readable storage medium of claim 26, wherein the learning model algorithm comprises a Bayesian network.

* * * * *